May 26, 1931.  L. DE FOREST  1,806,745
SOUND PRODUCING DEVICE
Filed Dec. 10, 1927   4 Sheets-Sheet 4

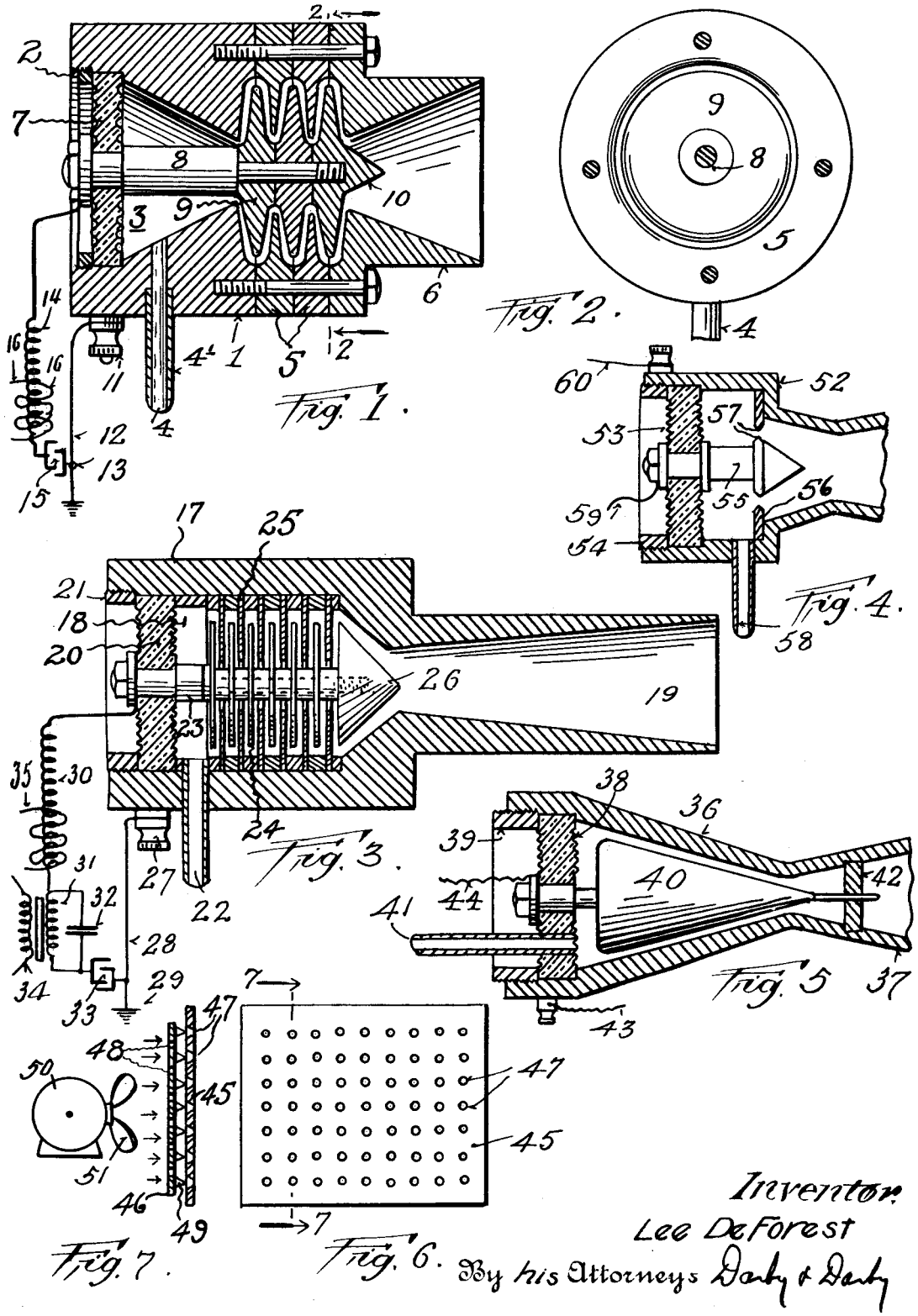

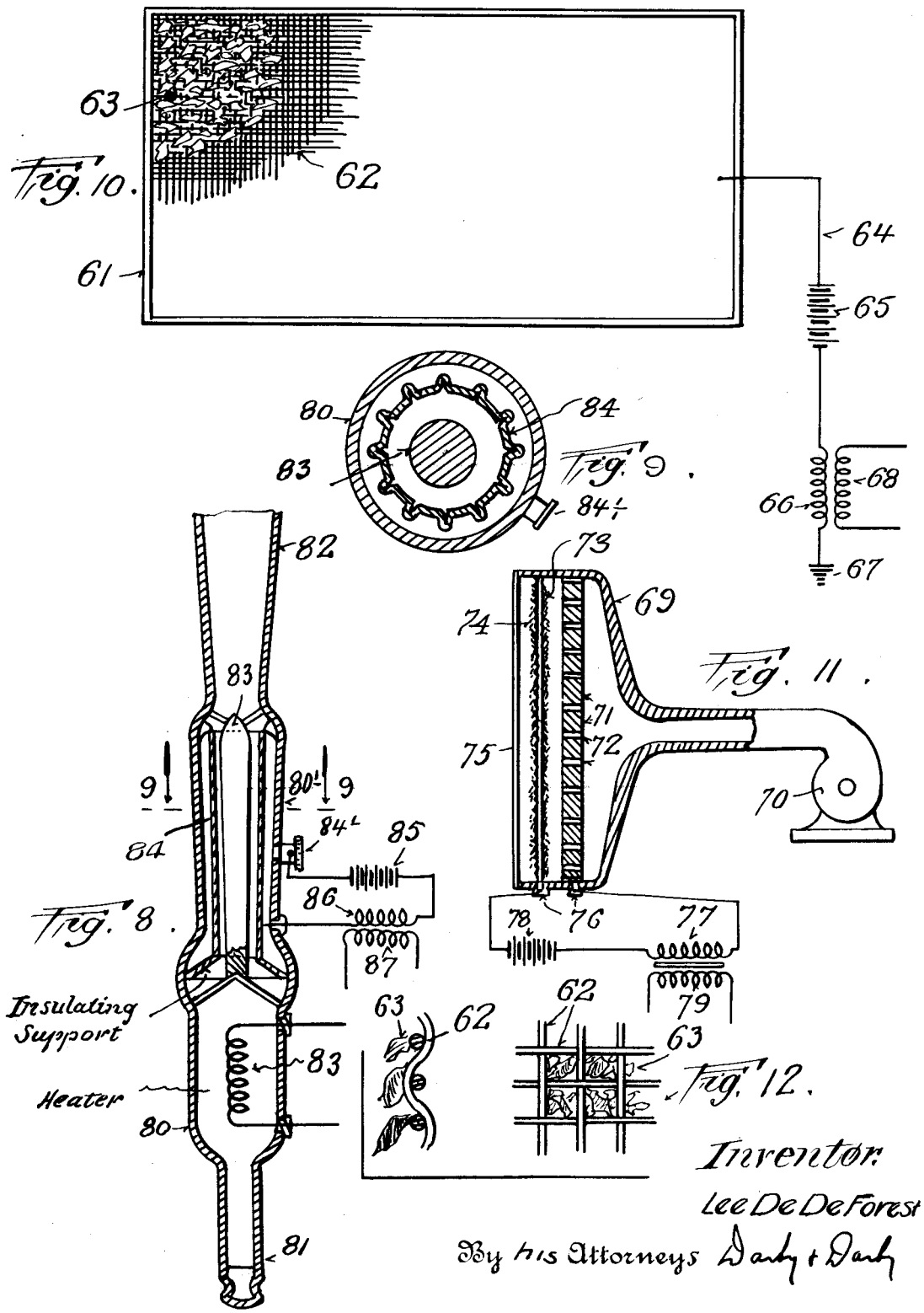

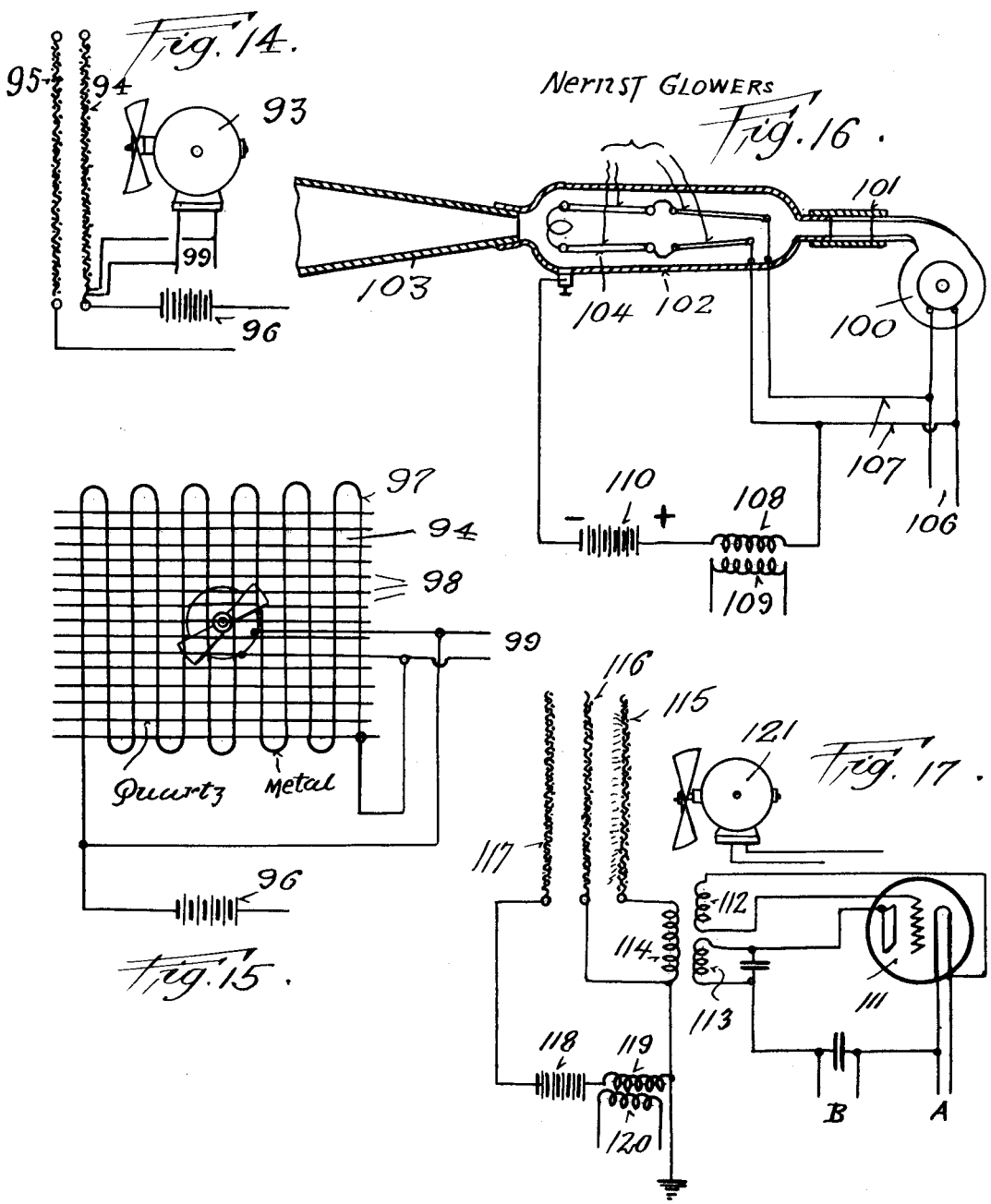

Inventor
Lee DeForest
By his Attorneys Darby + Darby

Patented May 26, 1931

1,806,745

UNITED STATES PATENT OFFICE

LEE DE FOREST, OF NEW YORK, N. Y., ASSIGNOR, BY MESNE ASSIGNMENTS, TO GENERAL TALKING PICTURES CORPORATION, A CORPORATION OF DELAWARE

SOUND PRODUCING DEVICE

Application filed December 10, 1927. Serial No. 239,018.

This invention relates in general to improved types of loud speaking devices.

One of the objects of this invention is the provision of a loud speaking device employing a compressed gas in the operation thereof and in some forms of the device, an ionized gas is preferred.

A further object of this invention is the construction of a loud speaking device having means for defining a path of gas flow and means for varying or modulating the flow of gas through this path to produce sound waves.

Another object of this invention is the provision of a loud speaking sound reproducer employing a thin film or lamina of gas confined between two adjacent metallic surfaces between which an electric tension exists whereby the resistance to the flow of the gas is varied in accordance with variations in the electric tension between the electrodes.

A still further object of this invention is the provision of a loud speaking sound reproducer of the above type in which means is provided for ionizing the gas either before or when it comes within the sphere or influence of the field of electric tension.

A further object of this invention is the provision of sound reproducing devices employing a gas in their operation in which the flow of gas is controlled by means of the forces of electric attraction and repulsion between closely associated elements.

These and still other objects as will appear from the disclosure which follows are obtained by means of the constructions disclosed hereinafter.

This invention resides substantially in the combination, construction, arrangement, relative location and circuital connections, all as will be more fully set forth for purposes of illustration in the following specification.

Referring to the drawings,

Figure 1 represents a longitudinal cross sectional view of one form of the device of this invention;

Fig. 2 is a cross sectional view taken on the line 2—2 of Fig. 1 looking in the direction of the arrows;

Fig. 3 is a longitudinal cross sectional view of a modified arrangement, somewhat similar to that of Fig. 1;

Figs. 4 and 5 show longitudinal cross sectional views of still two other modifications of the invention;

Fig. 6 represents a plan view of an entirely different form of the invention employing two separated perforated plates;

Fig. 7 is a cross sectional view of the arrangement of Fig. 6 taken on the line 7—7 showing relation of the gas source to the remainder of the parts;

Fig. 8 is a longitudinal cross sectional view of a modified arrangement showing a heating coil for ionizing the gas;

Fig. 9 is a cross sectional view taken on the line 9—9 of Fig. 8;

Fig. 10 is a still further modified form of the device employing a screen;

Fig. 11 is a modification of the arrangement of Fig. 10;

Fig. 12 represents enlarged detail views of the construction of the screen employed in the arrangements of Figs. 10 and 11;

Fig. 14 shows an arrangement similar to that of Fig. 13 in which one of the screens acts also as the gas ionizing means;

Fig. 15 illustrates the wiring connections for the arrangement of Fig. 14;

Fig. 16 is another modification of device employing Nernst blowers;

Fig. 17 is another modification employing three separating screens and a vacuum tube alternating current generator for energizing two of them;

Figure 18:
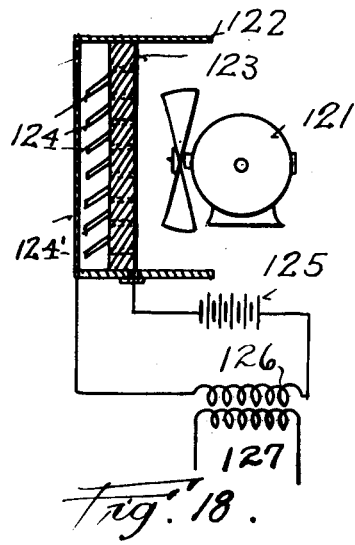
Fig. 18 illustrates another modification employing light metallic strips on the screen surface.

I have discovered that if a very thin film or lamina of a gas as for instance, air, be contained between two closely adjacent metallic surfaces or sharpened edges, the rigidity or viscosity of the said film depends to a certain degree upon the electric tension to which it is subjected. In other words, if the two closely adjacent parallel metallic surfaces or edges be made the terminal of an electric condenser, highly charged, the air in between said surfaces is put under an electric stress which greatly increases its resistance to movement or displacement. This action occurs whether the air is ionized or not. A certain degree of ionization takes place in the thin film of gas, thus situated between two oppositely charged metallic plates even before a corona discharge or electrical breakdown occurs. As a result of this phenomenon it is possible by purely electrical means to vary the resistance to the passage of an air stream between closely adjacent metallic surfaces. Thereby, it is possible by varying the applied voltages in accordance with sound waves to more or less modulate a passing stream of compressed gas as air between the metallic surfaces and thereby produce sound waves without any moving mechanical parts.

Referring to the drawings in the arrangement of Fig. 1, a suitable metallic member of any configuration having an enlarged bore therethrough is provided with a plate of insulating material 7, held within one end thereof by means of a threaded ring. A plate 7 seats against a shoulder in the bore and forms in conjunction with the casing member 1, the chamber 3, to which communication may be had through the passage 4 in the wall of the member 1 and the tube 4'. A plurality of plates 5 are clamped between the member 1 and the cover piece 6. These plates as well as the cover piece have a central bore and have their inner edges formed into a V-shape. The member 6 is so constructed that any suitable form of sound wave directing arrangement such as a horn, may be attached thereto. Mounted on the insulating plate 7 by means of a nut, is the rod 8 which has a reduced portion which is threaded at one end. Mounted on the reduced portion of the rod 8 are a series of plates which are tapered at their edges into a V-shape. The last plate 9 is provided with a conical projection 10 which extends into the conical recess in the cover member 6. The shapes of the plates 5 and 9, and their respective pieces as shown in the drawings, provide a tortuous path through which communication from the chamber 3 may be had with the exterior of the device. The binding post 11 is mounted on the member 1 and connects the device through the wire 12 to ground at 13. Another wire connected to the rod 8 is attached to one side of the secondary 14 of a Tesla coil, the other end of which is connected through a block condenser 15 to the wire 12. The coil 16 is shown forming the primary of the Tesla coil. The plates 9 and the member 1, plates 5 and cap member 6 together form the armature of an air condenser which condenser is connected in series with the condenser 15. Instead of employing a Tesla coil for charging the necessary high electric potentials across the two armatures of the device, any suitable source of direct high voltage, for example, a high voltage rectifier system, such as is used in radio transmitters could be utilized. In the operation of this device the compressed gas such as air is supplied to the chamber 3 through the passage 4 from any suitable constant pressure source. This gas may then escape from the chamber 3 to the sound wave directing device (not shown) through the tortuous path which is permeated by an electrostatic field. The resistance to the movement of the gas in this narrow tortuous path depends upon the electric potentials impressed across the armatures of the device. The output leads of a radio frequency oscillator are to be connected to the primary 16 for supplying in one form of the device the high electric potentials for the armatures and also the output terminals of an audio frequency amplifier are connected to the coil 16 through which the telephonic currents, which it is desired to transform into sound waves, are delivered to the device. The block condenser 15 is provided to give additional assurance against electric breakdowns across the thin air space in the compressed air modulator. This condenser 15 is of audio frequency capacity, as for example, one microfarad. By grounding the outside armature of the sound modulating condenser, the high potentials are confined to the inner armature only. The arrangement of Fig. 3 is somewhat similar and comprises a unitary hollow casing 17 provided with the chamber 18 and an integral projection having a conical passage 19 in communication therewith. As before, an insulating member 20 closes off the end of the chamber forming member and is held in proper position by means of the threaded ring 21. A series of flat plates 25 having central holes therein are mounted in spaced relation within the chamber 8 by means of rings. All of these parts are held in assembled position by means of the threaded ring 21. A rod 23 is mounted on the insulating plate 20 and is provided with a series of plates 24 which are interleaved with the plates 25. The end of the rod 23 is provided with a conical head 26 to provide a restricted escape passage for the compressed gas which is supplied to the chamber 18 through the tube 22. As before this arrangement provides a tortuous path through which the gas must flow in order to escape from the chamber 18. The binding post 27 is mounted on the casing 17 which is of metal and is connected through the wire 28 to ground 29. One terminal of the secondary 30 of a Tesla coil is connected to the rod 23 and the other end is connected in series with the secondary 31 of an audio frequency transformer which is in turn connected to the wire 28 through the blocking condenser 33. The radio frequency by-pass condenser 32 is shunted around the coil 31 to provide a path for the radio frequency currents flowing through the secondary of the Tesla coil. The Tesla coil is provided with the input primary coil 35 to which any suitable source of high potential, alternating current may be connected and the coil 34 is the primary of the audio frequency transformer and is to be connected to any desired source of telephonic currents from which it is desired to produce sound waves. As before, the plates 24 and 25 provide the armature of an air modulating condenser. The resistance to the flow of gas through the tortuous path is varied by and in accordance with varying potentials of the telephonic currents.

Instead of having an assemblage of circular disks or plates as shown above, it is possible to employ a single spiral strip wound or threaded around the central spindle 23 together with a similar outside spiral strip attached to the inner surface of the chamber forming member in such a way that a long, continuous spiral air channel of very narrow cross section is provided through which the gas may escape. In that case, the edges of the spiral channel should be closed off with an air tight insulating substance such as soft rubber throughout its length. It is of course obvious that various other mechanical arrangements for securing the same results could be devised, for instance, an arrangement is shown in Fig. 4 in which a casing 52 is provided within which is secured the insulating plate 53 by means of the threaded ring 54. A rod 55 is mounted on the plate 53 and has a conical head constructed to provide a sharp edge 57 at its base. A plate 56 having a central bore, the periphery of which is V-shape, surrounds the conical head so that the sharp edge 57 of the bore is in alignment with the sharp edge 57 of the conical head. Compressed gas is delivered to the interior of the device through the tube 58. The wire 60, attached to the casing 52 and the wire 59 attached to the rod 55 represent the wires which are to be connected to the source of high potentials whatever it may be and the output of the telephonic current producing devices. The operation of this device will be understood from the explanation of the operation of the foregoing devices.

In the modification of Fig. 5 a casing is shown at 36 provided with a conical passage therethrough. This casing may extend so as to form a horn shaped portion 37 all of which is not shown since any form of sound wave directing device can be used with this invention. As before an insulating plate 38 is held in position within the device by means of the threaded ring 39. A conical metallic member 40 is mounted on the plate 38 at one end and is supported on its other end by means of a spider 42 which centers the conical member and is so constructed as to permit of the free escape of gas thereby. The tube 41 provides communication to the chamber formed by the casing 36 and plate 38. A wire 43 is connected to the casing 36 and a wire 44 is connected to the conical member 40. The high electric potentials are impressed across the armature members 36 and 40 in a manner similar to that previously described and these potentials are varied by and in accordance with the potentials of telephonic currents to cause a modulating action on the flow of gas through the device in accordance with the changes in flow resistance of the gas caused by the changes in potential across the armatures.

In the arrangement of Figs. 6 and 7, the armatures in this case comprise the perforated plates 45 and 46 which have the perforations 47 and 48 respectively arranged so as to be out of alignment. The plate 46 is provided with a plurality of sharp, projecting points 49 in alignment with the holes 47 in the plate 45. The holes are of a conical form. A motor 50 provided with the fan 51 forces air through these plates. The electric circuit connections to the two plates which form the armatures of the modulating air condenser are connected to a source of high potential and to a source of telephonic currents in any of the ways described in connection with the previous figures which will be obvious to those skilled in the art without further description.

Another modification is shown in Fig. 8 in which a casing is shown comprising the portions 80, 80' and 82. The portion 80 is provided with the gas connecting tube 81 and provides a housing for the heating coil 83' by means of which the gas passing through the portion 80 may be highly heated to ionize it. Within the portion 80 of the casing is mounted a rod 83 so as to be in electrical contact therewith. This rod 83 is surrounded by a thin, corrugated, cylindrical casing 84 which is insulated from the rest of the device. The terminal post 84' is mounted on the casing and is connected to a source of high potential direct current 85. The other terminal of this source is connected in series through the secondary coil 86 of a transformer to the cylindrical casing 84. The telephonic currents are impressed upon the primary 87 of the transformer. In a practical application of this device the separation between the members 83 and 84 will be of the order of a few thousandths of an inch and the axial length of these elements may be several inches thereby affording the necessary friction to the passage of air or gas through the annular space between them. The corrugated member 84 expands and contracts in accordance with the varying electric potentials impressed between it and the member 83 to vary the cross section of the annular space and hence, the friction to the passage of gas therethrough. Likewise in connection with all the previous constructions disclosed, the separation between the armatures is of the order of a few thousandths of an inch.

Further modifications of the invention employing the influence of an electrostatic field upon a stream of flowing air are shown. In Fig. 10 a framework 61 supports a woven wire screen 62 over the surface of which is scattered a coating of fine, light, metallic flakes, such as aluminum or nickel. These flakes are attached as shown more clearly in Fig. 12 to the screen at their edges so as to leave them free. This screen is attached by the wire 64 to a high voltage source of current 65, the other terminal of which is grounded through the inductance 66 at 67. The output of the telephonic current source is connected across the inductance 68 associated with the inductance 66. The screen when connected in this manner becomes an electroscope and the light, metallic flakes which are conductively attached to the screen at one edge only, are repelled therefrom by the force of electric repulsion as shown in the large scale drawing, Fig. 12. The degree of repulsion depends upon the impressed electromotive force and as the varying telephonic currents cause a change in the electromotive force impressed on the screen, these flakes are more or less repelled to vary the position of the flakes with respect to the screen and each other. If behind the screen a suitable fan or other means for driving air through it is mounted, the passage of this air through the screen will be controlled in accordance with the varying telephonic currents impressed upon the primary 68.

In Fig. 11 a modified arrangement is shown in which a source of compressed air 70 connects with a casing 69 which may be of insulating material if desired. Within the casing 69 is mounted a conducting wall 71 provided with a plurality of holes 72 therethrough. A screen 73 covered with a plurality of light metallic flakes 74 is mounted adjacent to and parallel with the wall 71. If the casing 69 is of metal, the two screens must be separated therefrom by suitable insulating material as well understood in the electrical art. The wall 71 and screen 73 together provide the armatures of an air condenser and a difference of potential is created between them by means of a source of current 78 connected across the terminals 76 which in turn are connected to the wall and screen. The secondary 77 of an audio frequency transformer is connected in series with a current source and the screens. The telephonic currents are supplied to the primary 79 of the transformer. In this arrangement the escape of air through the wall and screen is controlled by the position of the metallic flakes attached to the screen which are in turn dependent on the resultant effect of the momentary electromotive force impressed across the armatures of the condenser. In order to protect against one's coming into actual contact with the high voltage screens there is shown a neutral insulating protecting screen 75 mounted on the front of the assembly.

Figure 13:
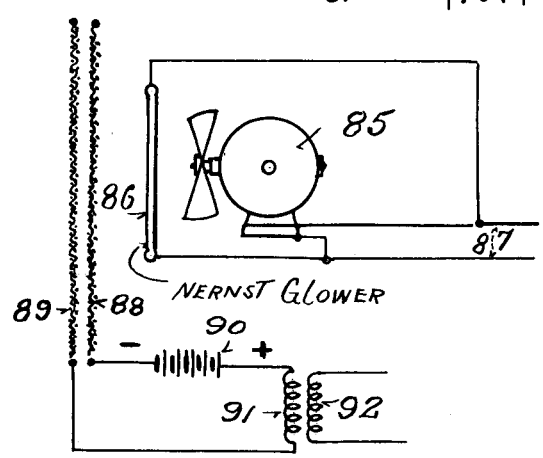
Fig. 13 represents a side elevational view of an arrangement employing two separated screens and means for ionizing the gas.

Fig. 13 discloses another modification of the device in which a source of air 85 directs air over a Nernst glower 86 for the purpose of ionizing the air or gas before it reaches the screens. The motor 85 and blower 86 are connected in parallel across the current wires 87. Two parallel separated screens, 88 and 89 are connected in series with a high potential source 90 and the secondary of an audio frequency transformer 91, the primary 92 of which receives the varying currents to be transformed into sound waves. The air from the fan upon encountering the Nernst glower is ionized thereby so that it becomes conducting and positively charged. This positive charged air passes through the fine mesh screen 88 and is more or less impeded in its passage through said screen depending upon the momentary voltage impressed thereon from the telephone transformer 91—92. By this arrangement there is a valving and controlling of the air stream in accordance with telephonic currents without moving parts.

The arrangement of Fig. 14 is somewhat similar to that of Fig. 13 with the exception that one of the screens has the further function of ionizing the gas. The gas pressure is provided by the motor 93 and its fan which is connected to the current wires 99 in parallel with the wires of the screen 94. To better understand this arrangement, the method of connecting the wires in the screen is shown in Fig. 15. The wire connected across the terminals 99 is made of nichrome or other suitable resistance wire capable of sustaining a high temperature in open air. The nichrome wire which is shown at 97 is interwoven with quartz or asbestos threads 98 so as to keep the wires insulated from each other and at the same time admit free passage of air through the screen. The wire screen 95 is placed adjacent to the screen 94 and parallel thereto. A high difference of potential is created between the screens 94 and 95 by the current source 96 and the air currents are impressed upon this circuit in the same manner as shown in Fig. 13. In this arrangement it will be readily understood that the gas upon coming in contact with the screen 94 is ionized by the high temperature thereof and is modulated in its flow therethrough by reason of the varying electromotive force impressed across the condenser by the telephonic currents.

In the arrangement of Fig. 16 a gas or air blower is shown at 100 connected through the insulating coupling 101 to the metallic casing 102 which is provided at its other end with a horn 103. Within the casing 102 are shown a number of Nernst glowers 104 connected in series to the current terminals 107 shunted across the feed wires 106. A high potential source 110 and the secondary of an audio frequency transformer 108 are connected in series with each other and are in turn connected to one of the terminals of the Nernst glowers and to the casing 102. The primary 109 of the audio frequency transformer receives the telephonic currents from any suitable source. The air or gas which is ionized by its passage over the Nernst glowers is attracted to the interior of the metallic casing 102. The amount of this attraction depends upon the electromotive force momentarily impressed upon the Nernst glower and the casing and thereby the passage of air through the casing into the horn is controlled by the telephonic currents impressed upon the transformer 108, 109.

In the modification disclosed in Fig. 17 three screens, 115, 116 and 117 are shown disposed in parallel planes. A suitable source of high potential 118 is connected in series with the inductances 119 and 114 and the three elements in series are connected to the screens 115 and 117. One terminal of the winding 119 is grounded. The audio frequency transformer having the coil 119 as its secondary is provided with a primary 120 which receives the varying currents to be transformed into sound waves. The screen 116 is connected by a wire at a point between the two inductances 114 and 119. The surface of the screen 115 is preferably constructed so that the surface thereof is provided with a plurality of fine sharp points as shown. The motor 121 and its fan causes the flow of air through the screens. In this arrangement instead of ionizing the air by high temperatures, it is ionized by a high voltage electric discharge. Any suitable source of high frequency high voltage current may be employed and in the arrangement shown a silent type, such as the oscillating audion, is employed. This audion is of the usual three electrode type shown at 111 having the inductance 112 in its grid filament circuit and the inductance 113 in its plate filament circuit. A suitable A. current source is supplied to heat the filament and the necessary plate voltage is supplied at the terminal B. The inductances 112 and 113 are associated together and with the inductance 114. This represents a very well known form of oscillating audion circuit. The high frequency oscillating currents generated by the audion are supplied through the inductance 113 to the inductance 114. The inductances 113 and 114 may be so constructed and arranged as to provide the well known Tesla transformer by means of which currents of high voltage are impressed across the screens. The telephonic currents are impressed across the screens 116 and 117 and the ionized air flowing through screen 115 is more or less impeded in its flow through the modulating air condenser comprising the screens 116 and 117 depending upon the varying potential between these screens in accordance with the telephonic currents supplied to the transformer 119—120.

In the arrangement shown in Fig. 18 the motor 121 and its fan forces air through the perforated metallic plate 123 mounted within the casing 122. The perforations are arranged in rows and in front of each row is shown hinged in any suitable way, or flexibly mounted, a light metallic member or valve 124 either in the form of a long strip as shown, or in the form of individual flakes. In front of plate 123 is mounted a metallic mesh through which the air can readily pass. The container 122 should be made of insulating material so as not to short circuit the screen and plate together. The high voltage source 125 connected through the inductance 126 is connected across the screen 124' and the plate 123. The voice currents are supplied to the coil 126 through the coil 127, which coils together provide an audio frequency transformer. The impedance to the flow of air through the device depends upon the position of the strips or flakes 124 with respect to the openings in the wall 123 which, in turn, depend upon the strength of the voltage impressed upon the plate 123.

Figure 19:
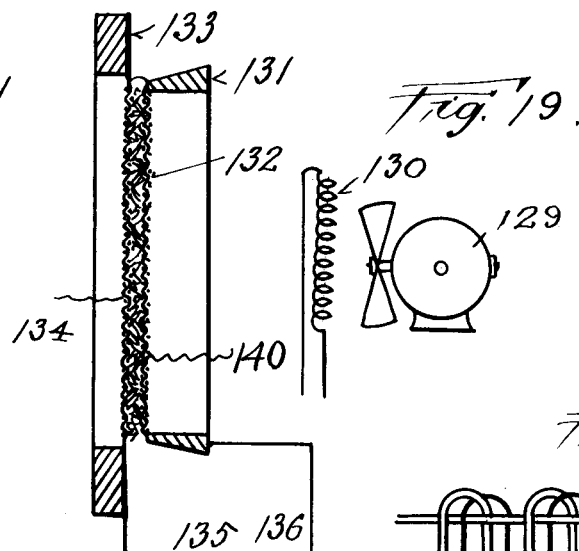
Fig. 19 illustrates still another modification employing screens separated by an insulating material.

In Fig. 19 there is shown two metallic frame works 131 and 133 on which are respectively mounted the screens 132 and 134. These screens are arranged in close proximity with each other but are insulated from each other. The space between these screens is loosely filled in with a suitable porous, fibrous, insulating material 140, for example, silk threads, cotton wool, glass wool and the like. The high voltage source 135 is connected to the frame work 133 and through the inductance 136 to the frame work 131. The varying currents to be converted into sound waves are impressed upon the inductance 137. The air source is shown at 129 and if desired, the heater 130 may be employed for ionizing the air. The high voltage potential impressed across these screens, which are insulated from each other, causes an electrostatic action attracting the screens towards each other, thereby more or less compressing the porous material occupying the space between them to correspondingly obstruct the passage of air therethrough.

Figure 20:
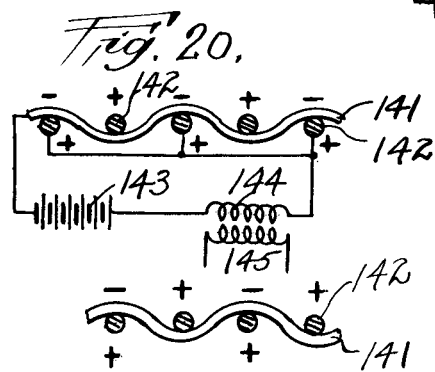
Fig. 20 is a diagrammatic illustration on an enlarged scale in which the principle of attraction and repulsion between oppositively polarized current carrying conductors is employed.
Figure 21:
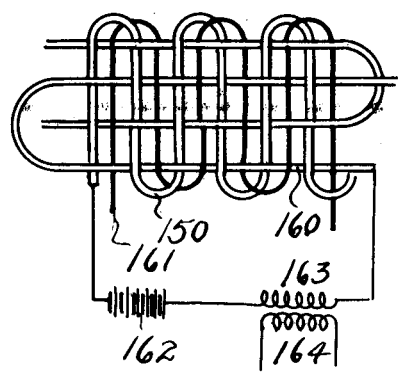
Figs. 21, 22, 23 and 24 show the enlarged views of such an arrangement.
Figure 22:
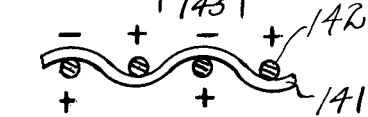
Figure 23:
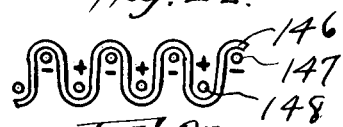
Figure 24:
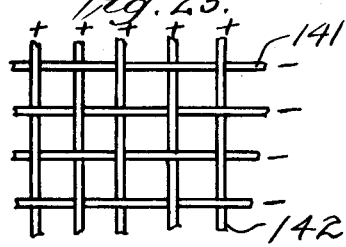

The arrangement disclosed in Figs. 20 to 24 show another modification employing the principles of this invention. In this arrangement the transverse wires shown in cross section at 142 of a wire screen are connected to the opposite terminal of the high voltage source 143 through the inductance 144. The longitudinal wires 141 of the screen are connected to the negative terminal of the source. The telephonic currents are supplied to the primary 145. If the screen so constructed is loosely woven it is apparent that when the potential across the two sets of wires of this mesh is varied, there is a tendency for them to be drawn together or varied in their position with respect to each other to alter the porosity of the screen. It is, of course, apparent that the drawings illustrate the parts on an enlarged scale. If desired, as shown in Fig. 23, the positive wires 148 and the negative wires 147 may be interwoven with flexible, insulating fabric thread 146. In Fig. 20 a different form of weave is employed wherein the wire 150 is of one polarity and the wires 160 are of another polarity. These two wires are interwoven with transverse threads or wires 161. If certain of these threads are metallic wire and others are non-metallic interwoven in any suitable manner and separate polarities impressed upon adjacent insulated wires and the voltage of such polarity is increased or decreased in accordance with the telephonic currents, I have found that the porosity of such a fabric varies in strict accordance with said impressed varying electromotive force. The fabric therefore offers greater or less resistance to the passage of compressed air from any suitable source and therefore, I am able to transform such direct flow of air into sound waves in accordance with the impressed telephonic currents. The wire 150 is connected to one terminal of the high voltage source 162, the other terminal of which is connected through the inductance 163 to the wire 160. The inductance 164 associated with inductance 163 receives the telephonic currents. It is obvious that the wires constituting such a screen of automatic varying porosity must be insulated to prevent electric breakdown. For such purpose I prefer enamel insulation. The wires used in weaving such a screen should be exceedingly fine, light and flexible, preferably of aluminum enamel insulated and interwoven with silk to give the necessary flexibility. It is obvious that such a screen must be closely but loosely woven so as to afford the necessary opposition to the free passage of air through the pores.

If such a two conductor metallic fabric as I have described, built up of two sets of fine enamel insulated wire be very closely woven so that the two sets of wires are in close proximity and the meshes between them are very small, and if sufficiently high electrostatic potentials be impressed across the two sets of wires, I find that the resistance which such a wire mesh offers to the passage of air therethrough varies in accordance with the momentary electric potentials impressed thereon. This holds even when the stream of air forced through the fabric is not previously ionized although the action is enhanced when the air stream is ionized.

Many other forms and arrangements or devices for securing the above described results and embodying the principles which I have here outlined will suggest themselves to those skilled in the art. I do not therefore, wish to be limited in my invention to the forms and arrangements hereinabove described, for instance, some of the principles involved in this invention are also employed in devices disclosed in my co-pending application, Serial Number 239,017, filed Dec. 10, 1927.

The various modifications disclosed have been given for the purpose of clearly illustrating the many forms of devices in which the principles of my invention may be embodied. Reference may be had to the disclosure for the purpose of illustrating my invention, but I wish it to be distinctly understood that I do not desire to be limited in the field of my invention except as required by the appended claims.

What I seek to secure by United States Letters Patent is:

1. In a sound reproducing device employing a gas modulated in accordance with voice currents, the combination with a porous screen having means for varying the resistance to the gas flowing therethrough by varying the area of the openings therein of means influenced by the voice currents to actuate the resistance varying means, means for ionizing the gas and means for producing a flow of gas through the porous screen.

2. In a sound reproducing device employing a gas modulated in accordance with voice currents, the combination with separated porous electrodes and means for providing a flow of gas therethrough of means for subjecting the electrodes to electric forces and means for varying the electric forces by and in accordance with the voice currents.

3. In a sound reproducing device employing a gas modulated in accordance with voice currents, the combination with separated porous electrodes and means for providing a flow of gas therethrough of means for subjecting the electrodes to electric forces and means for varying the electric forces by and in accordance with the voice currents and means for ionizing the gas before it enters the zone of influence of the electrodes.

In testimony whereof I have hereunto set my hand on this 5th day of December, A. D. 1927.

LEE DE FOREST.